United States Patent
Nakao et al.

(10) Patent No.: US 7,133,245 B2
(45) Date of Patent: Nov. 7, 2006

(54) SERVO WRITE HEAD ASSEMBLY AND SERVO WRITER

(75) Inventors: Toru Nakao, Kanagawa (JP); Takahisa Izumida, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 11/192,079

(22) Filed: Jul. 29, 2005

(65) Prior Publication Data

US 2005/0264919 A1 Dec. 1, 2005

Related U.S. Application Data

(62) Division of application No. 10/814,638, filed on Apr. 1, 2004.

(30) Foreign Application Priority Data

Apr. 22, 2003 (JP) .............................. 2003-116667

(51) Int. Cl.
*G11B 5/584* (2006.01)
*G11B 5/02* (2006.01)

(52) U.S. Cl. .................... 360/77.12; 360/57; 360/75

(58) Field of Classification Search ................ 360/57, 360/77.12, 77.13
See application file for complete search history.

(56) References Cited

U.S. PATENT DOCUMENTS 3,869,711 A * 3/1975 Bernard et al. ............... 360/17
4,996,609 A 2/1991 Joannou
5,689,384 A 11/1997 Albrecht et al.
5,959,812 A * 9/1999 Rothermel .................. 360/118
6,347,016 B1 2/2002 Ishida et al.
6,970,312 B1 11/2005 Yip et al.

FOREIGN PATENT DOCUMENTS

JP  08-030942 A  2/1996

* cited by examiner

*Primary Examiner*—Wayne Young
*Assistant Examiner*—Jason Olson
(74) *Attorney, Agent, or Firm*—Sughrue Mion, PLLC

(57) ABSTRACT

A servo write head assembly comprises an AC demagnetizing head that slides in contact with a magnetic tape all of which surface is magnetized in one direction of longitudinal directions thereof, and demagnetizes a data band of the magnetic tape; a servo write head that slides in contact with the magnetic tape, magnetizes a servo band of the magnetic tape in a reverse direction, and writes a servo signal; and a guide for regulating a movement in lateral directions of the magnetic tape that is running, wherein the AC demagnetizing head and the servo write head are integrally configured and the guide is provided between the AC demagnetizing head and the servo write head.

17 Claims, 10 Drawing Sheets

SERVO WRITE HEAD ASSEMBLY AND SERVO WRITER

This is a divisional of application Ser. No. 10/814,638 filed Apr. 1, 2004. The entire disclosure(s) of the prior application(s), application Ser. No. 10/814,638 is hereby incorporated by reference.

BACKGROUND OF THE INVENTION

1. Field of the Invention

The present invention relates to a servo write head assembly and servo writer that write a servo signal in a magnetic tape for performing tracking-control of a magnetic head.

2. Description of the Related Art

These years, in a magnetic tape a high density recording has progressed and there is the tape having a capacity of around 100 gigabytes for a backup of a computer. Therefore, several hundreds of data tracks are formed in the magnetic tape in a lateral direction. Accordingly, a width of a data track has extremely become narrow, and also a distance between adjacent data tracks has extremely become narrow. Therefore, in order to make a recording/reproducing element of a magnetic head trace the data track, a servo signal is written in the magnetic tape in advance, and with reading the servo signal by the magnetic head, a position thereof (position of the lateral direction of the magnetic tape) is servo-controlled (see Japanese Paten Laid-Open Publication No. Hei-8-30942).

And the servo signal is recorded on non magnetized magnetic tape so as to magnetize a servo band in one direction.

In other words, as shown in FIGS. 10A and 10B, conventional servo signals SS are formed on non magnetized servo bands SB by flowing a recording current pulse PC consisting of a zero current and a plus pulse current as a recording current in order to avoid a saturation phenomenon of a servo read element (MR (Magneto Resistive) element). If such the recording current pulse PC is used, a magnetic tape MT is not magnetized in areas except for servo patterns SP when the recording current pulse PC is the zero current; and when the plus pulse current of the recording current pulse PC flows, the servo patterns SP are magnetized in one direction by leak magnetic fluxes from servo gaps, thereby as a result the servo signals SS being written.

On the other hand, in a magnetic tape recoding/reproducing apparatus a change point of a magnetization in the servo signals SS is detected with a change of an electric resistance by an MR element, and the change point of the magnetization as a read signal is output in a differential waveform (voltage value). Therefore, the larger the electric resistance of the MR element becomes, the higher a peak voltage value of the read signal of the servo signals SS, thereby an SN (Signal/Noise) ratio of the read signal being improved. Accordingly, when changes of the servo signals SS themselves are large and a read area is large due to a wide width of the MR element, as shown in FIG. 10C a peak voltage value of a read signal RSL of the servo signals SS becomes high.

Whereas, hereafter the high density recording of the magnetic tape is foreseen to progress till around several tens of terabytes. Therefore, a number of data tracks of the magnetic tape, the width of the data track, and the distance between the adjacent data tracks will become narrower, and the magnetic tape itself will become a thin layer. Based upon this, an amount of magnetism that is detectable in reading a servo signal decreases and a change of a magnetization amount that is detectable with the servo read element also becomes small. Accordingly, as shown in FIG. 10D a peak voltage value of a read signal RSS of the servo signals SS becomes small, thereby the SN ratio of the read signal RSS worsening. As a result, in the magnetic tape recording/reproducing apparatus the servo signals SS becomes not able to be accurately read, thereby highly accurate position control of the magnetic head resulting in being not able to be performed.

Consequently, a servo write head assembly and servo writer, which can write a servo signal that is high in the SN ratio thereof, are strongly requested.

SUMMARY OF THE INVENTION

In order to solve the problems described above, a first aspect of the present invention is a servo write head assembly that comprises an AC demagnetizing head that contacts a magnetic tape all of which surface is magnetized in one direction of longitudinal directions thereof, and demagnetizes a data band of the magnetic tape; a servo write head that slides in contact with the magnetic tape, magnetizes a servo band of the magnetic tape in a reverse direction, and writes a servo signal; and a guide for regulating a movement in lateral directions of the magnetic tape that is running, wherein the AC demagnetizing head and the servo write head are integrally configured and the guide is provided between the AC demagnetizing head and the servo write head.

The servo write head assembly writes the servo signal by the servo write head magnetizing the servo band of the magnetic tape, all of which surface is magnetized in one direction of the longitudinal directions thereof, for example, in a magnetic tape travel direction (this direction is referred to as "forward direction"), in the reverse direction. As a result, when the servo signal is read with a servo read element, a change rate and change amount of a magnetic field at a change portion of a servo pattern magnetized in the reverse direction for a base portion of the servo band magnetized in the forward direction become large, thereby an output of the servo signal becoming high. Accordingly, the servo write head assembly enables the servo signal, which is high in an SN ratio of a read signal thereof, to be written in the magnetic tape.

In the write head assembly, for example, the AC demagnetizing head demagnetizes nothing except for a data band out of the magnetic tape all of which surface is magnetized in the forward direction of the longitudinal directions thereof. Accordingly, in recording a data signal on the data band the write head assembly enables the magnetic tape, where the data signal can be preferably recorded, to be obtained since the data signal to be recorded is not influenced by a magnetization (forward direction magnetization) originally recorded.

In addition, in the servo write head assembly a relative positional relationship of the AC demagnetizing head and the servo write head is fixed in accordance with the AC demagnetizing head and the servo write head respectively integrated. And an oscillation in lateral directions of the magnetic tape running between the AC demagnetizing head and the servo write head is regulated with the guide provided between the AC demagnetizing head and the servo write head. Accordingly, the servo write head assembly enables the magnetization of the servo band to be accurately demagnetized and enables the servo signal to be accurately written on the servo band.

Meanwhile, a position of the AC demagnetizing head may be at any of upstream and downstream sides of the servo write head for the magnetic tape travel direction.

A second aspect of the present invention is a servo write head assembly that comprises a DC demagnetizing head that slides in contact with a magnetic tape that is running, and magnetizes at least a servo band of the magnetic tape in one direction of longitudinal directions thereof; a servo write head that is provided at a downstream side of a magnetic tape travel direction of the magnetic tape of the DC demagnetizing head, slides in contact with the magnetic tape that is running, magnetizes the servo band in a reverse direction, and writes a servo signal; and a guide for regulating a movement in lateral directions of the magnetic tape that is running, wherein the DC demagnetizing head and the servo write head are integrally configured and the guide is provided between the DC demagnetizing head and the servo write head.

In the write head assembly the DC demagnetizing head magnetizes any one direction of longitudinal directions of the magnetic tape, for example, toward the forward direction. Next, the servo signal is written by the servo write head magnetizing the servo band magnetized in the forward direction in the reverse direction. As a result, since when reading the servo signal with a servo read element of a magnetic head, a change rate and change amount of a magnetic field at a change portion of a servo pattern magnetized in the reverse direction for a base portion of the servo band magnetized in the forward direction become large, thereby an output of the servo signal becoming high. Accordingly, the servo write head assembly enables the servo signal, which is high in the SN ratio thereof, to be written in the magnetic tape.

In addition, in the servo write head assembly a relative positional relationship of the DC demagnetizing head and the servo write head is fixed in accordance with the DC head and the servo write head respectively integrated. And an oscillation in lateral directions of the magnetic tape running between the DC demagnetizing head and the servo write head is regulated with the guide provided between the DC demagnetizing head and the servo write head. Accordingly, the servo write head assembly enables the magnetization of the servo band to be accurately magnetized in one direction of the longitudinal directions and enables the servo signal to be accurately written on the servo band.

A third aspect of the present invention is a servo writer that comprises a magnetic tape running system that sends a magnetic tape, all of which surface is magnetized in one direction of longitudinal directions, out of a supply reel, and winds the magnetic tape with a winder, thereby running the tape; an AC demagnetizing head that slides in contact with the magnetic tape that is running, and demagnetizes a servo band; a servo write head that slides in contact with the magnetic tape that is running, magnetizes a servo band of the magnetic tape in a reverse direction, and writes a servo signal,; and a guide for regulating a movement in lateral directions of the magnetic tape, wherein the AC demagnetizing head and the servo write head are integrally configured and the guide is provided between the AC demagnetizing head and the servo write head.

In the servo writer, for example, when the magnetic tape all of which surface is magnetized in the forward direction by a magnetic tape running system, same as described in the first aspect of the present invention, the servo write head writes the servo signal by magnetizing the servo band magnetized in the forward direction in the reverse direction. Accordingly, same as described in the first aspect of the present invention, the servo writer enables the servo signal, which is high in the SN ratio of a read signal thereof, to be written in the magnetic tape.

In addition, same as described in the first aspect of the present invention, the servo writer enables nothing except for the data band out of the magnetic tape, all of which surface is magnetized in the forward direction of longitudinal directions, to be demagnetized by the AC demagnetizing head. Accordingly, the servo writer enables the magnetic tape, where a data signal can be preferably recorded, to be obtained since the data signal is not influenced by a magnetization (magnetization in the forward direction) originally recorded.

In addition, the AC demagnetizing head and the servo write head are integrally configured, and since the guide is provided between the AC demagnetizing head and the servo write head, same as described in the first aspect of the present invention, the relative positional relationship of the AC demagnetizing head and the servo write head is fixed and an oscillation in lateral directions of the magnetic tape running between the AC demagnetizing head and the servo write head is regulated. Accordingly, same as described in the first aspect of the present invention, the servo writer enables the magnetization of the servo band to be accurately magnetized in one direction of longitudinal directions and enables the servo signal to be accurately written on the servo band.

A fourth aspect of the present invention is a servo writer that comprises a magnetic tape running system that sends a magnetic tape out of a supply reel, and winds the magnetic tape with a winder, thereby running the tape; a DC demagnetizing head that slides in contact with the magnetic tape that is running, and magnetizes at least a servo band of the magnetic tape in one direction of longitudinal directions; a servo write head that is provided at a downstream side of a magnetic tape travel direction of the DC demagnetizing head, slides in contact with the magnetic tape that is running, magnetizes the servo band in a reverse direction, and writes a servo signal; and a guide for regulating a movement in lateral directions of the magnetic tape that is running, wherein the DC demagnetizing head and the servo write head are integrally configured and the guide is provided between the DC demagnetizing head and the servo write head.

In the servo writer, for example, when the magnetic tape runs, same as described in the second aspect of the present invention, the DC demagnetizing head magnetizes the servo band toward the forward direction of the magnetic tape and the servo write head writes the servo signal by magnetizing the servo band magnetized in the forward direction in the reverse direction. Accordingly, same as described in the second aspect of the present invention, the servo writer enables the servo signal, which is high in the SN ratio of a read signal thereof, to be written in the magnetic tape.

In addition, in the servo writer the DC demagnetizing head and the servo write head are integrally configured, and since the guide is provided between the DC demagnetizing head and the servo write head, same as described in the second aspect of the present invention, the relative positional relationship of the DC demagnetizing head and the servo write head is fixed and an oscillation in lateral directions of the magnetic tape running between the DC demagnetizing head and the servo write head is regulated. Accordingly, same as described in the second aspect of the present invention, the servo writer enables the portion of the servo band to be accurately magnetized in one direction of longitudinal directions and enables the servo signal to be accurately written on the servo band.

Meanwhile, in the first to fourth aspects of the present invention "to be integrally configured" includes being configured by joining two components into one.

BRIEF DESCRIPTION OF THE DRAWINGS

In FIGS. 6A, 6B, and 6C.

In FIGS. 9A and 9B.

FIG. 10A is a drawing showing a recording current in writing the servo signal; FIG. 10B is a plan view of the magnetic tape; FIG. 10C is a drawing showing a read signal when a width of a read element is wide; and FIG. 10D is a drawing showing another read signal when the width of the read element is narrow.

DESCRIPTION OF THE PREFERRED EMBODIMENTS

[First Embodiment]

Hereinafter, the embodiments of the present invention will be described, referring to FIGS. 1 to 4 as needed.

Figure 1:
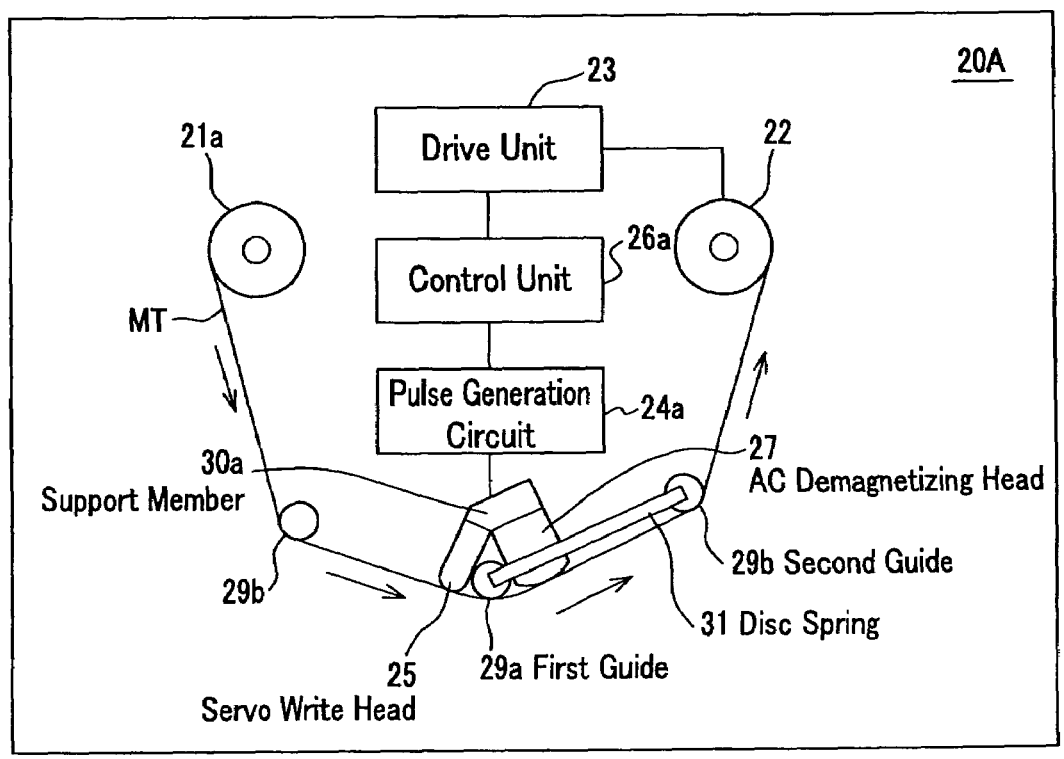
FIG. 1 is a configuration drawing of a servo writer of a first embodiment.

As shown in FIG. 1, a servo writer 20 A mainly comprises a supply reel 21a, a winder 22, a drive unit 23, a pulse generation circuit 24a, a servo write head 25, an AC demagnetizing head 27, a control unit 26a, first guides 29a, and second guides 29b. In addition, in the servo writer 20A is also provided a power source unit, a cleaning unit for cleaning a magnetic tape MT, a verification unit for inspecting written servo signals, and the like, which are not shown.

On the supply reel 21a the magnetic tape MT, which is slit into a product width from a wide whole web before servo signals are written therein, is set as a large diameter winding of a pancake, and the supply reel 21a is configured so as to send out the magnetic tape MT in writing the servo signals. Meanwhile, in the magnetic tape MT an orientation treatment is performed in a process for manufacturing a pancake shaped magnetic tape described later, and in advance, all surface of the magnetic tape MT is magnetized in one direction of longitudinal directions thereof, to be more precise, in a magnetic tape travel direction, that is, in the forward direction.

The winder 22 is configured so as to wind the magnetic tape MT that is sent out of the supply reel 21a and guided with the first guides 29a and the second guides 29b.

The drive unit 23 is a unit for rotationally driving the winder 22, and comprises a motor, a motor drive circuit for supplying a motor current, a gear for coupling a motor shaft and the winder 22, and the like which are not shown. The drive unit 23 generates the motor current in the motor drive circuit, based on a motor current signal from the control unit 26a, supplies the motor current to the motor, and furthermore, transmits rotation drive force of the motor to the winder 22 through the gear, thereby rotating the winder 22.

The pulse generation circuit 24a is a circuit for generating a recording current pulse PC1 (see FIG. 6C) described later, and comprises various electronic components. And the pulse generation circuit 24a is configured so as to generate the recording current pulse PC1, based on a pulse control current from the control unit 26a. In addition, the pulse generation circuit 24a is configured so as to continuously give an alternating current demagnetizing current for the AC demagnetizing head 27.

The control unit 26a is a unit for controlling operation of each part of the servo writer 20A, and comprises a CPU (Central Processing Unit), various memory units, and the like. In order to make a magnetic tape running speed constant in writing the servo signals, the control unit 26a generates the motor current signal for controlling the motor current of the drive unit 23, and sends it to the drive unit 23. In addition, the control unit 26a generates a pulse control signal for generating the recording current pulse PC1 (see FIG. 6C) at the pulse generation circuit 24a and is configured so as to send the pulse control signal to the pulse generation circuit 24a. In addition, the control unit 26a generates a demagnetization control signal for generating the alternating current demagnetizing current at the pulse generation circuit 24a and is configured so as to send the alternating current demagnetizing current to the pulse generation circuit 24a.

Figure 2:
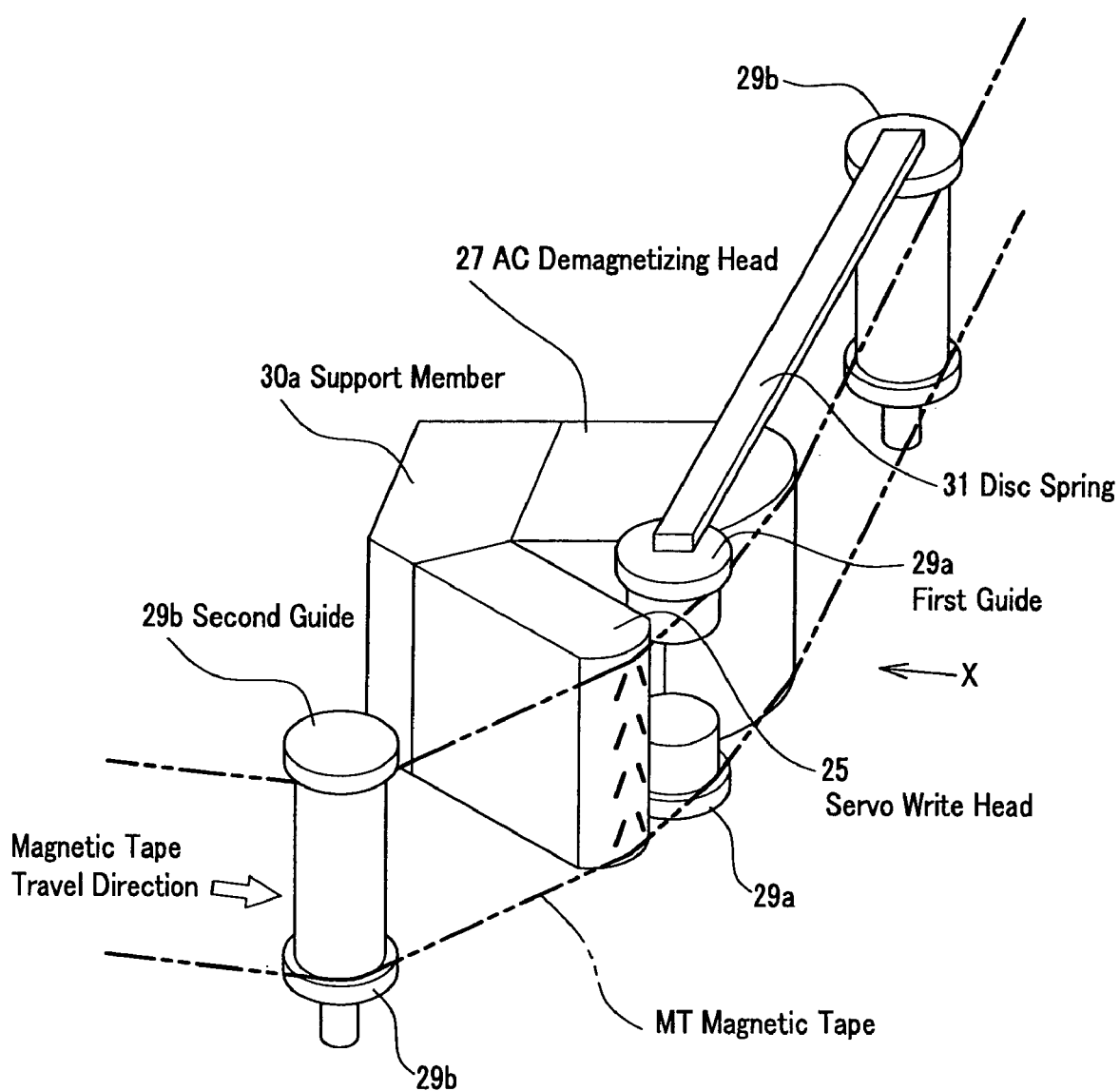
FIG. 2 is a perspective view showing an appearance around a first guide of the servo writer of FIG. 1.

The servo write head 25 and the AC demagnetizing head 27 are, as shown in FIG. 2, arranged so as to slide in contact with the magnetic tape MT that is running by being guided with the second guides 29b. And in the servo writer 20A the servo write head 25 is arranged at an upstream side in the magnetic tape travel direction; the AC demagnetizing head 27 is arranged at a downstream in the magnetic tape travel direction.

The servo write head 25 and the AC demagnetizing head 27 are integrally configured with being connected to a support member 30a fixed at a platform not shown, and both tops thereof, which respectively extend from the support member 30a and respectively slide in contact with the magnetic tape MT, form a gap with a distance. In the gap a pair of the first guides 29a described next are designed to be arranged.

Figure 3:
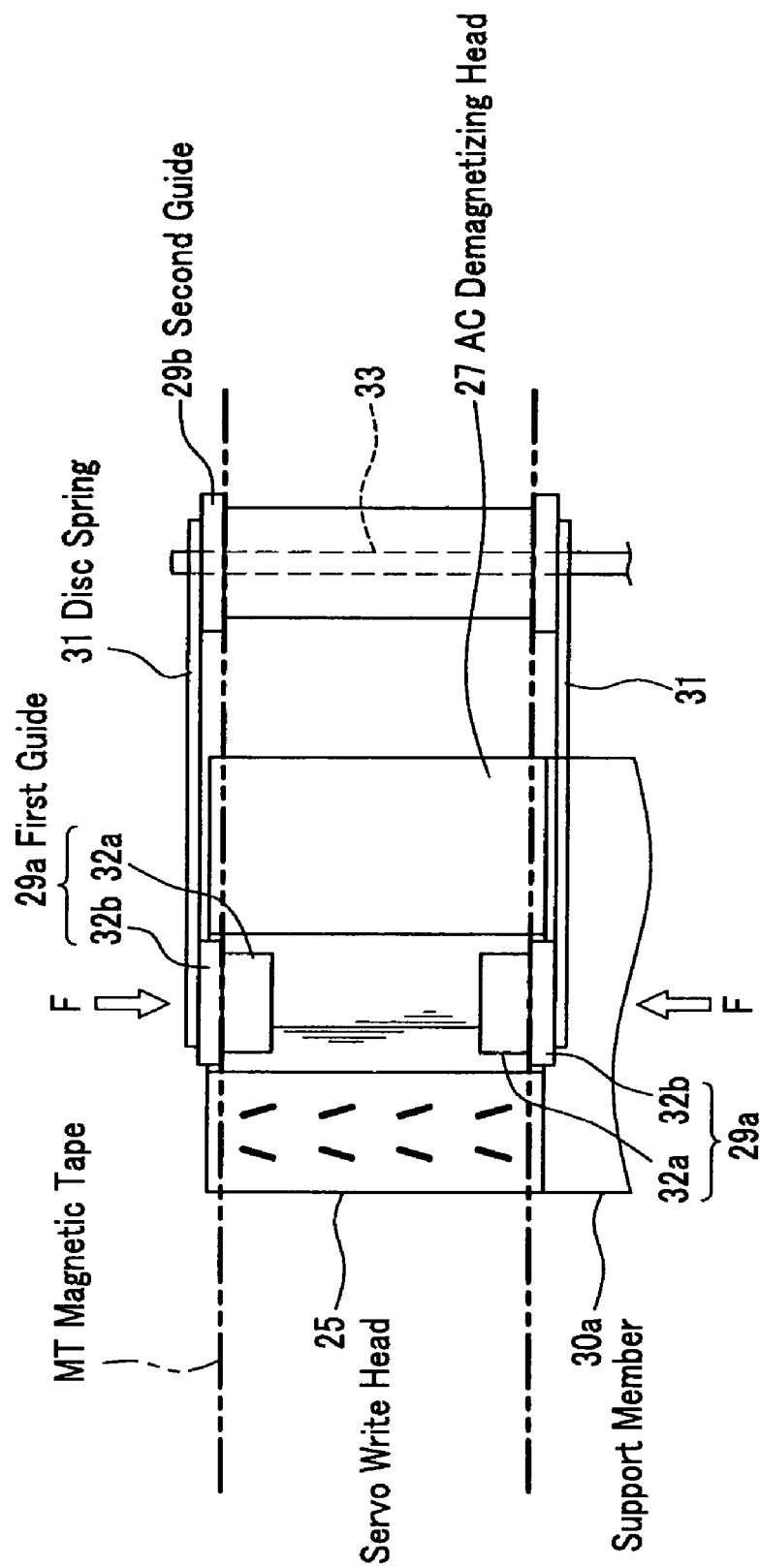
FIG. 3 is a drawing showing an appearance where the first guide of FIG. 2 is seen from an arrow direction X of FIG. 2.

Here, as obvious referring to FIG. 3 in combination, the pair of the guides 29a are configured of rollers 32a for holding down a surface of the magnetic tape MT with circumferential surfaces thereof and flanges 32b for holding down side edges of the magnetic tape MT that is running.

Each of the pair of the first guides 29a is oppositely arranged each other at the gap between the servo write head 25 and the AC demagnetizing head 27 SO as to pinch the magnetic tape MT, which is running between them, from lateral directions thereof.

These first guides 29a are attached to disc springs 31 and arranged at the gap. Bases of the disc springs 31 are fixed at a shaft member 33 for rotatably supporting one of the second guides 29b that extends from the bases not shown, and at tops extending from the shaft member 33, the disc springs 31 rotatably support the first guides 29a. And each of the first guides 29a is designed to push each side edge of the magnetic tape MT oscillated in lateral directions with a minute energizing force F. The energizing force F is preferably $0.490 \times 10^{-2}$ to $7.84 \times 10^{-2}$ N and more preferably $0.490 \times 10^{-2}$ to $3.92 \times 10^{-2}$ N.

Figure 4:
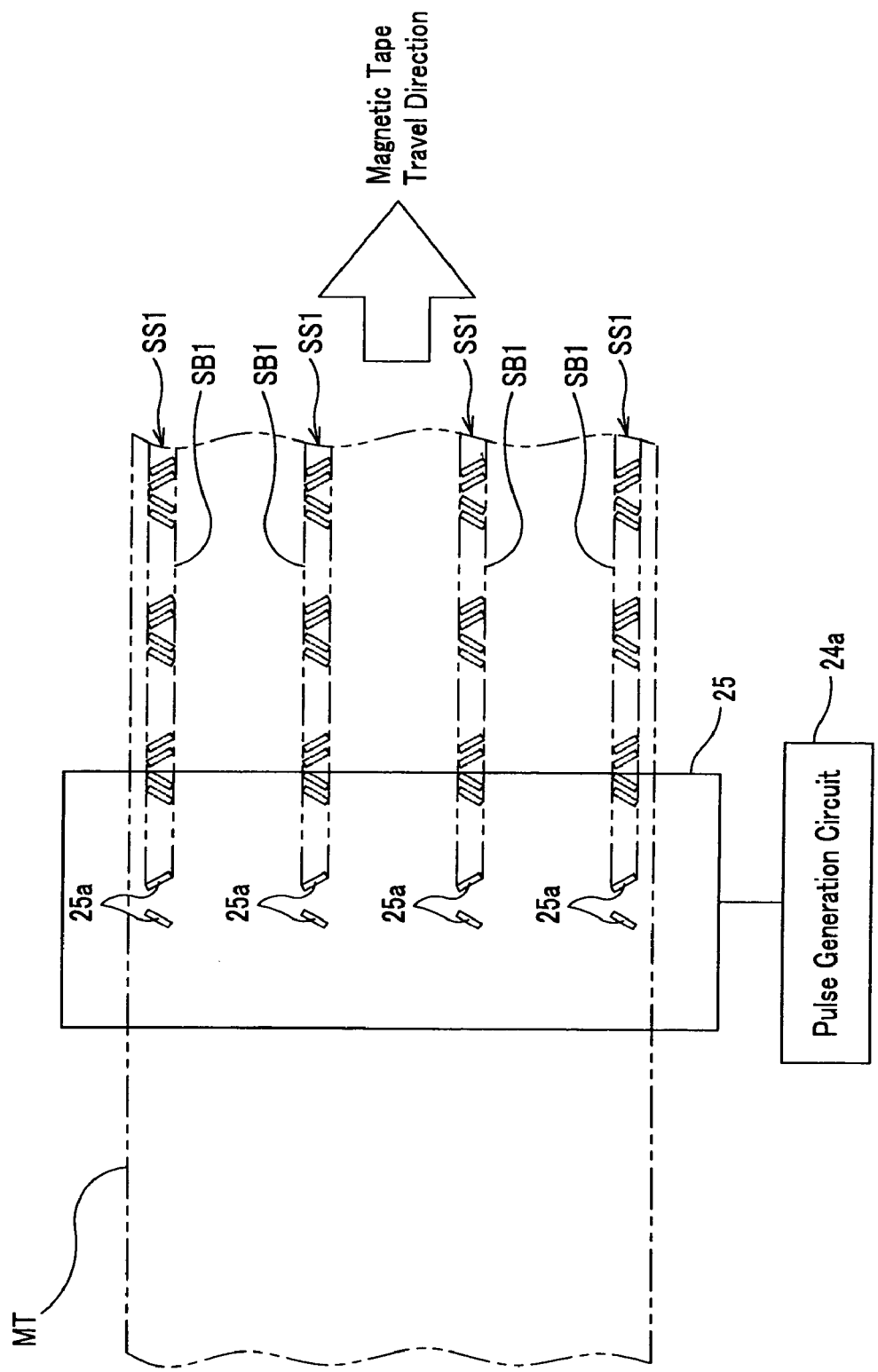
FIG. 4 is a plan view of a servo write head used for the servo writer of FIG. 1.

The servo write head 25 is a magnetic head for writing a servo signal, comprises a coil (not shown) for generating a magnetic flux by the recording current pulse PC1 (see FIG. 6C) being given from the pulse generation circuit 24a, and as shown in FIG. 4, head gaps 25a are formed. In the servo write head 25 four pieces of the head gaps 25a are arranged in a line, corresponding to lateral direction positions of four pieces of the servo bands SB1 formed on the magnetic tape MT. The head gaps 25a are formed by a lithography where semiconductor technology is applied, and have a bottom-open unparallel reverse V letter shape with a predetermined angle for longitudinal directions of the magnetic tape MT.

The AC demagnetizing head 27 is a head for demagnetizing a portion corresponding to data bands of the magnetic tape MT by magnetizing the portion with an alternating current. The AC demagnetizing head 27 comprises a coil (not shown) for generating a magnetic flux by an alternating current demagnetizing current given from the pulse generation circuit 24a. And on a sliding contact surface of the magnetic tape MT of the AC demagnetizing head 27, magnetic gaps (not shown) for a demagnetization are provided at positions corresponding to data bands of the magnetic tape MT. Of course, the AC demagnetizing head 27 may be configured so as not to demagnetize a portion of servo bands, and may also be configured so as to demagnetize a portion except for the data bands and servo bands of the magnetic tape MT which portion is not used for recoding data, for example, guard bands GB1 (see FIG. 6A) formed at both edges of the magnetic tape MT in longitudinal directions thereof.

Next, operation of the servo writer 20A of the embodiment will be described, referring to FIGS. 5 and 6.

First, on the supply reel 21a of the servo writer 20A (see FIG. 1) is set a pancake shape of the magnetic tape MT after a slit. The pancake shape of the magnetic tape MT is manufactured as shown in FIG. 5 by passing a base film BF through a coating process 11, an orientation process 12, a drying process 13, a calendar process 14, and a slitting process 15. Meanwhile, the magnetic tape MT that has finished till the slitting process 15 is a tape where a servo signal is not yet recorded.

All surface of the magnetic tape MT is magnetized in one direction (forward direction) by a web W, where a magnetic paint is coated in the coating process 11, passing through a place where same polarities (N polarities in FIG. 5) of two magnets 12a and 12b are made opposite.

After such the pancake shape of the magnetic tape MT is set at the supply reel 21a, a top of the magnetic tape MT is joined on a core of the winder 22.

Next, when the drive unit 23 rotates the winder 22 by the motor current signal from the control unit 26a, the magnetic tape MT runs by being wound with the winder 22 while the second guides 29b and the like guide the tape MT. And servo signals SS1 are written by the servo write head 25 sliding in contact with the tape MT that is running.

Figure 6A:
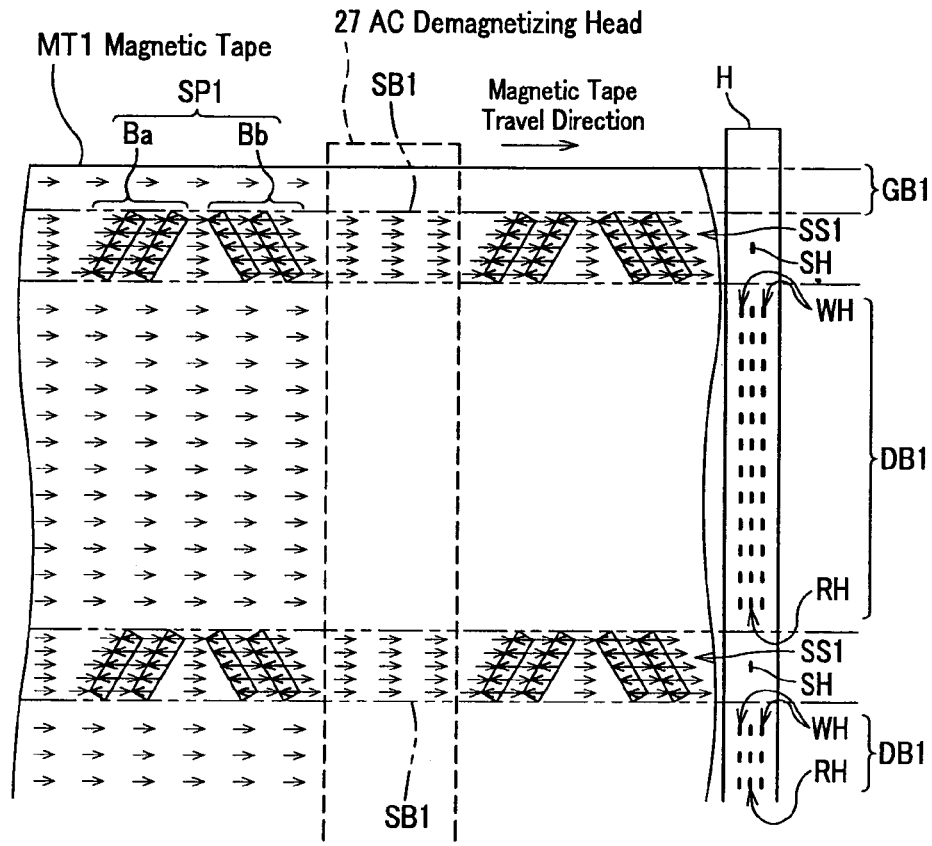
FIG. 6A is an enlarged plan view illustrating a magnetization state of a magnetic tape magnetized by the servo writer of FIG. 1.
Figure 6B:
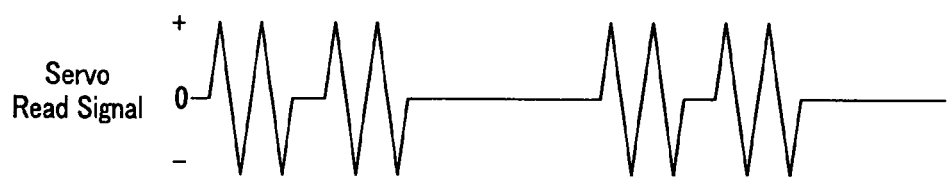
FIG. 6B is a drawing showing a servo signal read from the magnetic tape of FIG. 6A.
Figure 6C:
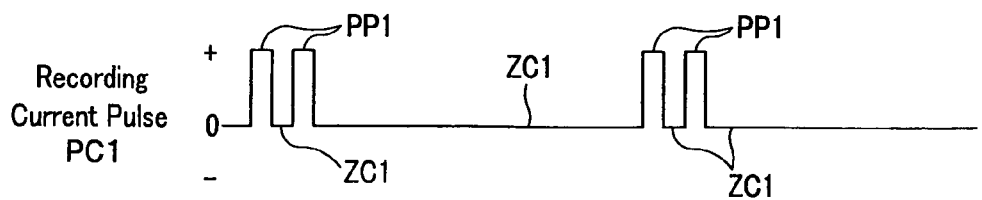
FIG. 6C is a drawing showing a signal in writing the servo signal.

Then, the pulse generation circuit 24a generates, as shown in FIG. 6C, a plus pulse current PP1 of a plus polarity, a zero current ZC1, another plus pulse current PP1, and another zero current ZC1 in this order, based on the pulse control signal from the control unit 26a, and then repeats a pattern where no current (zero current ZC) for a predetermined time is generated, thereby generating a recording current pulse PC1. Meanwhile, at that time the control unit 26a generates, as shown in FIG. 6A, the pulse control signal for controlling a current, pulse width, and generation timing of the plus pulse currents PP1 of the recording current pulse PC1 and sends them to the pulse generation circuit 24a, in order to set a servo signal that prescribes a predetermined interval for forming the patterns SP1 and a width of longitudinal directions thereof.

If a pulse train of the recording current pulse PC1 is thus flowed at a predetermined pattern from the control unit 26a to the coil of the servo write head 25, a magnetic layer of the magnetic tape MT is magnetized in a reverse direction by a leak magnetic flux from the head gaps 25a when the plus pulse currents PP1 flow in the coil; and the magnetic layer of the magnetic tape MT is not magnetized when the recording current pulse PC1 is the zero currents ZC1. As a result, the servo patterns SP1 magnetized in the reverse direction are formed on a base portion of the servo bands SB1 magnetized in the forward direction of the magnetic tape MT. Of course, a portion of the servo bands SB1 except for the servo patterns SP1 is magnetized in the forward direction as it is.

Meanwhile, a current of the plus pulse currents PP1 at this time is sufficient one for magnetizing the magnetic layer of the magnetic tape MT by the leak magnetic flux from the head gaps 25a, and is set by taking such characteristics of the coil of the servo write head 25 into consideration. In addition, a pulse width (time) of the plus pulse currents PP1 can prescribe a predetermined width of the servo patterns SP1 in the longitudinal directions, and is set by taking a running speed of the magnetic tape MT, a shape of the head gaps 25a of the servo write head 25, and the like into consideration (see FIG. 4). In addition, a predetermined time of the zero currents ZC1 can prescribe the predetermined interval for forming the servo patterns SP1, and is set by taking the running speed of the magnetic tape MT and the like into consideration.

And the AC demagnetizing head 27 provided at the downstream side of the magnetic tape travel direction of the servo write head 25 demagnetizes a portion corresponding to the data bands DB1 of the magnetic tape MT. The winder 22 winds the demagnetized magnetic tape MT.

In such the servo writer 20A of the embodiment the servo write head 25 and the AC demagnetizing head 27 are integrally configured (see FIG. 2) and the first guides 29a (see FIG. 3) regulate a movement in the lateral directions of the magnetic tape MT, which is running between the servo write head 25 and the AC demagnetizing head 27, by the energizing force F of the disc springs 31. As a result, in the servo writer 20A a sliding contact surface of the AC demagnetizing head 27 with the magnetic tape MT is generally long, so even if a distance between the second guides 29b (see FIG. 1) arranged at the upstream/downstream sides of the AC demagnetizing head 27 is obliged to be taken wide, the magnetic tape MT is not oscillated in the lateral directions thereof between the servo write head 25 and the AC demagnetizing head 27. Accordingly, the servo writer 20A can accurately demagnetize nothing except for the portion of the data bands DB1 and leave a magnetization in the forward direction of the portion of the servo bands SB1. In addition, since in accordance with the servo writer 20A of the embodiment a curvature of servo bands SB1 extending in the longitudinal directions of the magnetic tape MT can be restrained by preventing oscillations of the lateral directions of the magnetic tape MT, a position error signal (PES) is reduced.

The magnetic tape MT where a magnetization treatment is performed by such the servo writer 20A has, as obvious again referring to FIG. 6A, a plurality of the servo bands SB1 extending in the longitudinal directions of the magnetic tape MT and each of the data bands DB1 positioned between each two of the servo bands SB1. Each of the servo bands SB1 is magnetized in the magnetic tape travel direction (forward direction) of the longitudinal directions. The magnetization is shown by small arrow marks in FIG. 6A. And the servo signals SS1 are written with magnetizing the servo bands SB1 in the reverse direction. The servo signals SS1 form each of servo patterns SP1 by: a burst Ba that is a magnetization portion like two stripes making a positively slanted angle for the travel direction of the magnetic tape MT; and a burst Bb that is following the burst Ba and is the magnetization portion like two stripes making a negatively slanted angle for the travel direction. And the servo patterns SP1 are repeatedly formed at a predetermined distance in the longitudinal directions, thereby the servo signals SS1 being configured. And each of the data bands DB1 between each two of the servo bands SB1 is demagnetized by the AC demagnetizing head 27. Thus, the magnetic tape MT, where the servo signals SS1 are written and wound on the winder 22, is slit into a tape length depending on a product specification, and then is housed in a cartridge case and the like (not shown).

Meanwhile, although in the embodiment each of the servo patterns SP1 is configured of each two of positively slanted stripes and negatively slanted stripes, it is variable as needed, for example, such as being configured of each five of the positively slanted stripes and the negatively slanted stripes; and being alternately configured of each five of the positively slanted stripes and the negatively slanted stripes and each four of the positively slanted stripes and the negatively slanted stripes. In addition, in FIG. 6A the servo patterns SP1 are drawn comparatively large for the magnetic tape MT in order to be easily understood.

In FIG. 6A is shown a positional relationship of a magnetic head H for the magnetic tape MT. In the magnetic head H servo read elements SH for reading the servo signals SS1 are parallely provided in a lateral direction of the magnetic tape MT at a same distance as that of a plurality of the servo bands SB1. And between each two of the servo read elements SH are provided a plurality of recording elements WH ranging in two lines in the lateral direction of the magnetic tape MT in order to record signals on the data bands DB1. Furthermore, between the recording elements WH are provided a plurality of reproducing elements RH ranging in one line in the lateral direction of the magnetic tape MT.

When for the magnetic tape MT thus described, data is recorded/reproduced with the magnetic head H of a magnetic tape drive (not shown), the servo signals SS1 are read with the servo read elements SH. Since the servo patterns SP1 of the servo signals SS1 are slanted for the travel direction (equal to a longitudinal direction) of the magnetic tape MT and are formed by respective unparallel stripes, a timing when the servo read elements SH read the servo signals SS1 and detect a pulse differs in accordance with relative positions in the lateral direction of the magnetic tape MT and the magnetic head H. Therefore, the recording elements WH or the reproducing elements RH can be accurately positioned onto predetermined tracks of the data bands DB1 by controlling a position of the magnetic head H so that a timing for reading the pulse becomes a predetermined condition.

Then, an output (peak voltage value) with which the servo read elements SH read the servo signals SS1 depends on a change rate or change amount of a change-over between a portion where no signal is recorded and another portion where signals are recorded. And in the embodiment a magnetic direction largely varies from the forward direction to the reverse direction at a change portion from the base portion of the servo bands SB1 magnetized in the forward direction to the servo patterns SP1 magnetized in the reverse direction. In addition, the magnetic direction largely varies from the reverse direction to the forward direction also at a change portion from the portion of the servo patterns SP1 magnetized in the reverse direction to the base portion of the servo bands SB1 magnetized in the forward direction. Therefore, depending on the large magnetic change, as shown in FIG. 6B, the servo signals SS1 can be read with a high output. Accordingly, the SN ratio of read signals of the servo signals SS1 can be improved.

In addition, since in the magnetic tape MT magnetized by the servo writer 20A of the embodiment the data bands DB1 thereof are demagnetized by the AC demagnetizing head 27, magnetic signals recorded in the data bands DB1 are not influenced by other magnetizations. Accordingly, the magnetic signals can be surely recorded.

In addition, since the magnetic tape MT magnetized by the servo writer 20A of the embodiment is narrower in a data track width thereof, the tape MT can be effectively used, particularly when it is used for a magnetic tape whose magnetic layer is thinner and a magnetic tape drive where a width of the servo read elements SH for reading the servo signal SS1 is narrower. That is, since conventionally a care must be taken for a saturation phenomenon of the MR element, it was avoided to write servo signals magnetized in the reverse direction on a portion magnetized by a direct current; however when making the magnetic layer thinner and the data track width narrower in order to enlarge a memory capacity per volume, the configuration of the present invention, which can get a read output of the servo signals with a high output, becomes suitable.

As such a magnetic tape is preferable a case that an Mrt (product of a magnetic layer residual magnetization Mr and a thickness t of a magnetic layer) is $5.0 \times 10^{-10}$ T·m ($4.0 \times 10^{-2}$ memu/cm$^2$) to $7.5 \times 10^{-8}$ T·m (6.0 memu/cm$^2$) is more preferable another case that $5.0 \times 10^{-10}$ T·m ($4.0 \times 10^{-2}$ memu/cm$^2$) to $5.0 \times 10^{-8}$ T·m (4.0 memu/cm$^2$); and is most preferable still another case that $5.0 \times 10^{-10}$ T·m ($4.0 \times 10^{-2}$ memu/cm$^2$) to $2.5 \times 10^{-8}$ T·m (2.0 memu/cm$^2$).

In addition, a Tw (track width of a servo read element) is preferable in a case of 0.1 µm to 30 µm, more preferable in another case of 0.1 µm to 15 µm, and most preferable in still another case of 0.1 µm to 7 µm.

Furthermore, the thickness of the magnetic layer is preferable in a case of 10 nm to 300 nm, more preferable in another case of 10 nm to 200 nm, and most preferable in still another case of 10 nm to 100 nm.

Describing suitable examples of magnetic tapes of the present invention in more detail, magnetic tapes, which have a non-magnetic layer and a magnetic layer on one face of a support body and a back layer on the opposite face thereof, are preferable. In addition, in a magnetic recording medium of the present invention the magnetic recording medium, which has layers other than the non-magnetic layer, the magnetic layer, and the back layer, are also included. For example, the recording medium may has a soft magnetic layer containing soft magnetic powders, a second magnetic layer, a cushion layer, an overcoat layer, an adhesion layer, and a protection layer. These layers can be provided at adequate positions so as to effectively bring out their functions. A thickness of the non magnetic layer can be made 0.5 µm to 3 µm: the thickness of the non magnetic layer is desirable to be thicker than that of the magnetic layer.

Although a ferromagnetic powder for use in the magnetic layer of the magnetic recording medium of the present invention is not specifically restricted, a ferromagnetic metal powder and a hexagonal ferrite powder are preferable.

An average particle size of the ferromagnetic powder is preferably 20 nm to 60 nm. When the ferromagnetic powder for use in the present invention is acicular and the like, the average particle size represented by an average long axis length is preferably 30 nm to 45 nm, and an average acicular ratio is preferably 3 to 7; when the ferromagnetic powder is platy, the average particle size is represented by an average plate diameter, it is preferably 25 nm to 35 nm, and an average plate ratio is preferably 2 to 5.

In the ferromagnetic metal powder, an $S_{BET}$ (specific surface area of the BET (Brunauer, Emmett and Teller) method) is usually 40 m$^2$/g to 80 m$^2$/g and preferably 50 m$^2$/g to 70 m$^2$/g. A crystal size is usually 10 nm to 25 nm and preferably 11 nm to 22 nm. A pH of the ferromagnetic metal powder is preferably not less than 7. As the ferromagnetic metal powders, a single material and alloy of Fe, Ni, Fe—Co, Fe—Ni, Co—Ni, Co—Ni—Fe, and the like are cited, and within a range of not more than 20 mass percent of metal compositions can be contained aluminum, silicon, sulfur, scandium, titan, vanadium, chromium, manganese, copper, zinc, yttrium, molybdenum, rhodium, palladium, gold, tin, antimony, boron, barium, tantalum, tungsten, renium, silver, lead, phosphorus, lanthanum, cerium, praseodymium, neodymium, tellurium, bismuth, and the like. In addition, the ferromagnetic metal powders may also contain a small amount of water, a hydroxide, and an oxide. Manufacturing methods of these ferromagnetic metal powders are already well known and ferromagnetic metal powders for use in the present invention can also be manufactured in accordance with well known methods. Although shapes of the ferromagnetic metal powders are not particularly restricted, usually an acicular shape, a grit shape, a cubic shape, a rice grain shape, a plate shape, and the like are used. It is specifically preferable to use acicular ferromagnetic metal powders.

A resistance magnetism Hc of the ferromagnetic metal powders is preferably 144 kA/m to 300 kA/m and more preferably 160 kA/m to 224 kA/m. In addition, a saturation magnetization thereof is preferably 85 A·m$^2$/kg to 150 A·m$^2$/kg and more preferably 100 A·m$^2$/kg to 130 A·m$^2$/kg.

As the hexagonal ferrite powders there are a barium ferrite, a strontium ferrite, a lead ferrite, a calcium ferrite, and various replacement materials, for example, a Co replacement material, and the like. To be more precise, are cited a magnetoplumbite type of barium ferrite and strontium ferrite, the magnetoplumbite type of ferrite whose particle surface is covered with spinel, further a compound magnetoplumbite type of barium ferrite and strontium ferrite that partially contain a spinel phase, and the like; and other than predetermined elements, following ones may be contained: Al, Si, S, Ba, Nb, Sn, Ti, V, Cr, Cu, Y, Mo, Rh, Pd, Ag, Sb, Te, W, Re, Au, Bi, La, Ce, Pr, Nd, P, Co, Mn, Zn, Ni, B, Ge, and the like. Generally, the hexagonal ferrite powder where following compounds are added can be used: Co—Zn, Co—Ti, Co—Ti—Zr, Co—Ti—Zn, Ni—Ti—Zn, Nb—Zn—Co, Sn—Zn—Co, Sn—Co—Ti, Nb—Zn, and the like. Some hexagonal ferrite powders contain a specific impurity in accordance with materials and/or manufacturing methods. The hexagonal ferrite powders are a hexagonal plate shape.

When reproducing with a magnetic resistant head (MR head) to particularly raise a track density, it is requested to make a noise low: if an average plate diameter is too small, a stable magnetization cannot be desired due to heat fluctuations. In addition, if the average plate diameter is too large, the noise is high, thereby both cases being unfit for the high density recording. Although if the average plate ratio is small, a filling property in the magnetic layer becomes large and it is preferable, a sufficient orientation cannot be obtained. If the filling property is too large, the noise becomes high due to stacking between powders. The specific surface area in accordance with the BET method is usually 30 m$^2$/g to 200 m$^2$/g, and 50 m$^2$/g to 100 m$^2$/g is preferable. The specific surface area generally accords with an arithmetic calculation value from a powder plate diameter and a thickness thereof. A distribution of the plate diameter and the thickness is preferable to be narrower. Although many distributions are not a normal distribution with being calculated in a standard deviation for a powder size, it is expressed as σ/(average plate diameter or average thickness) =0.1 to 0.5. In order to make a powder size distribution sharp, it is performed to make a powder generation-reaction system uniform as much as possible and to also dispense a distribution improvement treatment to a generation powder. For example, such a method of selectively dissolving an ultra minuscule powder in an acid solution is also known. In a vitrification-crystallization method a more uniform powder is obtained by performing heat treatments plural times and separating nucleus generation and growth. Although the resistance magnetism Hc measured in a magnetic powder can be made till around 40 kA to 400 kA, 144 kA to 300 kA is preferable. Although a high Hc is advantageous in the high density recording, an ability of a recording head is restricted. An Hc can be controlled by the powder size (plate diameter and plate thickness), kinds and amounts of contained elements, replacement sites of elements, powder generation-reaction conditions, and the like.

A saturation magnetization σs is preferably 30 A·m$^2$/kg to 70 A·m$^2$/kg. The σs tends to become smaller as a powder becomes minuscule. For manufacturing methods thereof, there are a method of lessening crystallization temperature or heat treatment time, another method of increasing addition compounds, still another method of increasing an amount of surface treatment, and the like.

In addition, it is possible to use a W type of a hexagonal ferrite. In dispersing the magnetic material a surface of a magnetic powder is also treated with a dispersion medium and a material matching a polymer. An inorganic compound and an organic compound are used as a surface treatment agent. As main compounds typical examples are: an oxide and hydroxide of Si, Al, P, and the like; various silane coupling agents; and various titan coupling agents. An amount thereof is 0.1 to 10 mass percent for a magnetic material. A pH thereof is also important for dispersion. It is usually around 4 to 12, and although there is an optimum value in accordance with the dispersion medium and the polymer, around 6 to 11 is selected from a chemical stability and storage stability of the magnetic recording medium. A water content contained in the magnetic material also influences the dispersion. Although there is an optimum value thereof in accordance with the dispersion medium and the polymer, usually 0.1 to 2.0 mass percent is selected. The present invention does not select manufacturing methods although there are methods as follows: (1) a vitrification-crystallization method of mixing metal oxides, which replaces a barium carbonate, an iron oxide, and an iron, with such a boron oxide as a glass forming material so as to become a predesired ferrite composition, then melting it, making an amorphous material by rapid cooling, next dispensing a reheating treatment, and then cleaning and pulverizing it, thereby obtaining a barium ferrite crystalline powder; (2) a water-heat reaction method of neutralizing a metal salt solution of a barium ferrite composition with alkali, removing byproducts, then heating it in a liquid phase at not less than 100 degrees Celsius, and then cleaning and pulverizing it, thereby obtaining the barium ferrite crystalline powder; and (3) a coprecipitation method of neutralizing the metal salt solution of the barium ferrite composition with alkali, removing byproducts, then drying it, performing a heat treatment at not more than 1100 degrees Celsius, and pulverizing it, thereby obtaining the barium ferrite crystalline powder.

[Second Embodiment]

Figure 7:
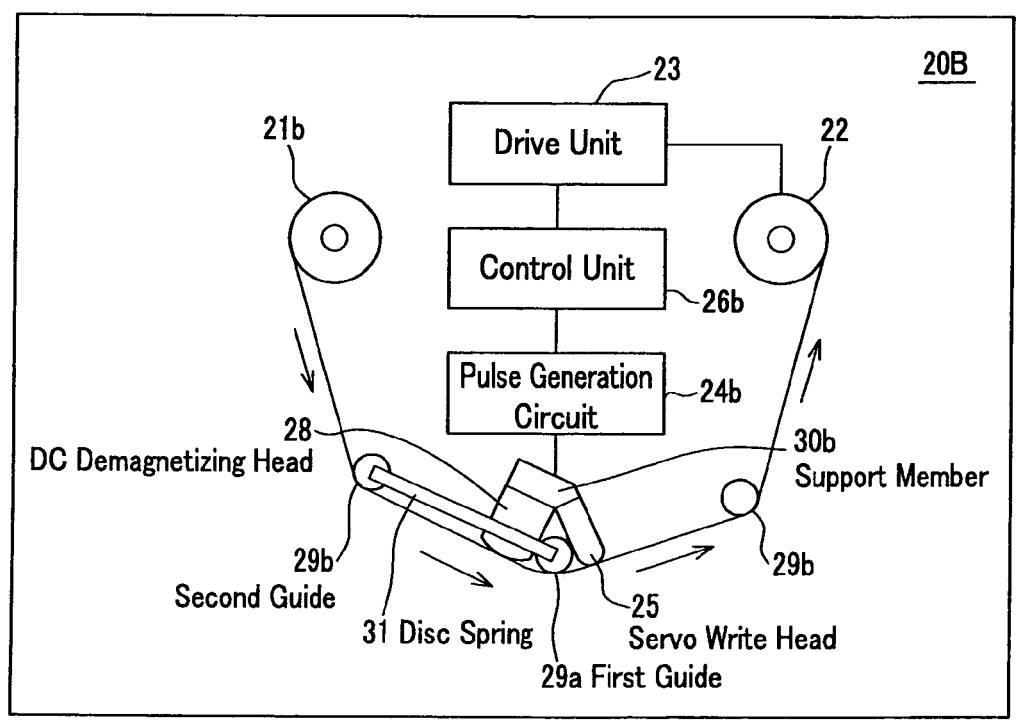
FIG. 7 is a configuration drawing of a servo writer of a second embodiment.

The second embodiment of a servo writer related to the present invention will be described, referring to FIG. 7 as needed. FIG. 7 is a configuration drawing of a servo writer of the second embodiment. Meanwhile, in the embodiment same symbols will be appended to same portions as in the first embodiment and descriptions thereof will be omitted.

Figure 5:
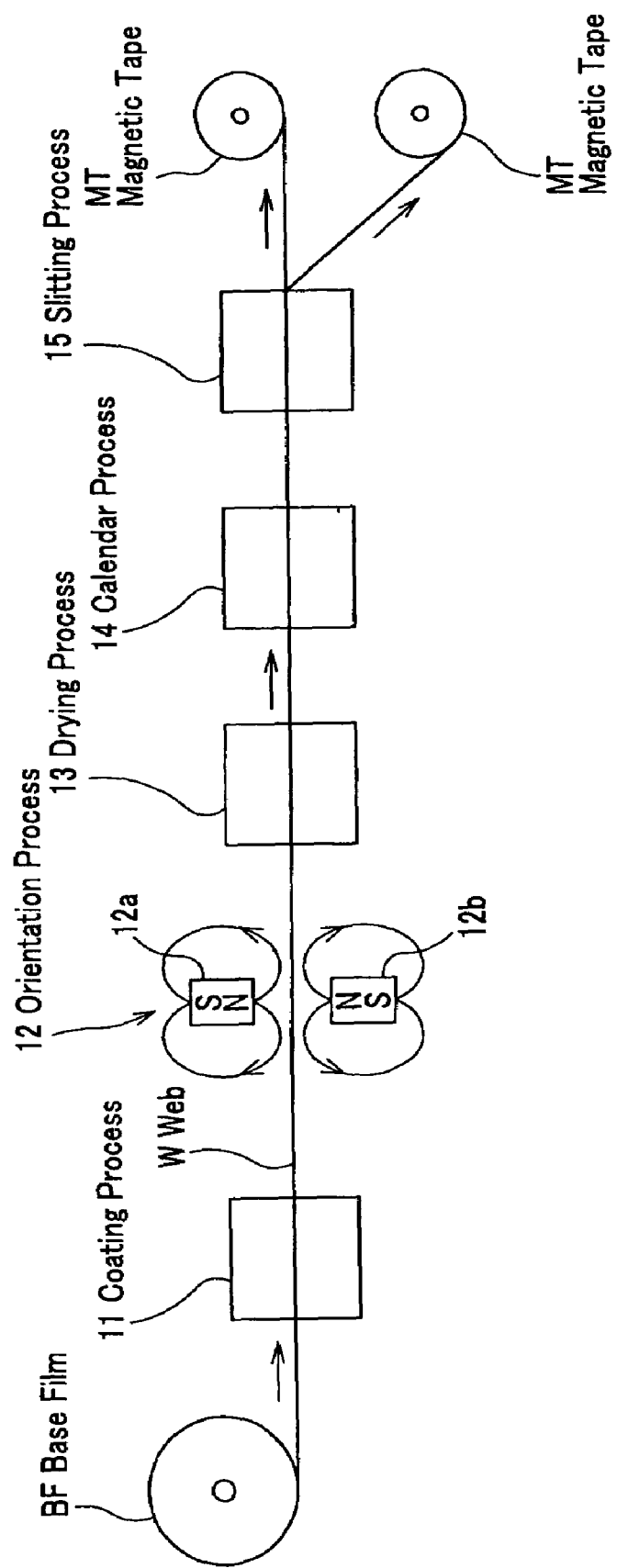
FIG. 5. is a drawing illustrating a manufacturing process of a pancake that is set on a supply reel so the servo writer of FIG. 1.

The servo writer 20B of the embodiment is a servo writer for recording a servo signal on the magnetic tape MT demagnetized all over a surface thereof in advance: in the manufacturing process shown in FIG. 5 the servo writer 20B is for writing the servo signal on the magnetic tape MT demagnetized in a demagnetizing process (not shown) that is further provided after the drying process 13 thereof.

As shown in FIG. 7, the servo writer 20B mainly comprises a supply reel 21b, the winder 22, the drive unit 23, a pulse generation circuit 24b, the servo write head 25, a DC demagnetizing head 28, a control unit 26b, the first guides 29a, and the second guides 29b. Meanwhile, the winder 22, the drive unit 23, the first guides 29a, and the second guides 29b are same ones used in the servo writer 20A of the first embodiment.

The supply reel 21b is configured same as the supply reel 21a (see FIG. 1) used in the first embodiment except that the magnetic tape MT demagnetized all over the surface thereof in advance is wound around the supply reel 21b.

The pulse generation circuit 24b is configured same as in the pulse generation circuit 24a used in the first embodiment, so as to generate the recording current pulses PC1 (see FIG. 6C) for writing the servo signal in the servo write head 25, and is configured so as to continuously give a direct current demagnetizing current to the DC demagnetizing head 28.

The control unit 26b generates, same as the control unit 26a used in the first embodiment, the motor current signal for controlling the motor current of the drive unit 23, and is configured so as to generate the pulse control signal for generating the recording current pulses PC1 at the pulse generation circuit 24b. Moreover, the control unit 26b generates a demagnetization control signal for generating the direct current demagnetization current at the pulse generation circuit 24b, and is configured so as to send the demagnetization control signal to the circuit 24b.

The servo write head 25 and the DC demagnetizing head 28 are integrally configured with each base thereof being connected to a support member 30b fixed at a platform not shown, and both tops of the servo write head 25 and the DC demagnetizing head 28, which extend from the support member 30b and respectively slide in contact with the magnetic tape MT, form a gap with a distance. In the gap a pair of the first guides 29a configured same as in the first embodiment are designed to be arranged. However, the first guides 29a used in the embodiment are different from those of the first embodiment (see FIG. 1) in nothing except for a point that the former are connected through the disc springs 31 to a shaft member (not shown) for supporting the second guides 29b that are arranged at an upstream side of a magnetic tape travel direction of the DC demagnetizing head 28.

The DC demagnetizing head 28 is a head for magnetizing a portion corresponding to servo bands of the magnetic tape MT by a direct current, and comprises a coil (not shown) generating a magnetic flux by the direct current magnetization current being given from the pulse generation circuit 24b. And magnetic gaps (not shown) for a direct current demagnetization are provided at corresponding positions of the servo bands the magnetic tape MT on a sliding contact surface of the tape MT of the DC demagnetizing head 28.

Figure 8:
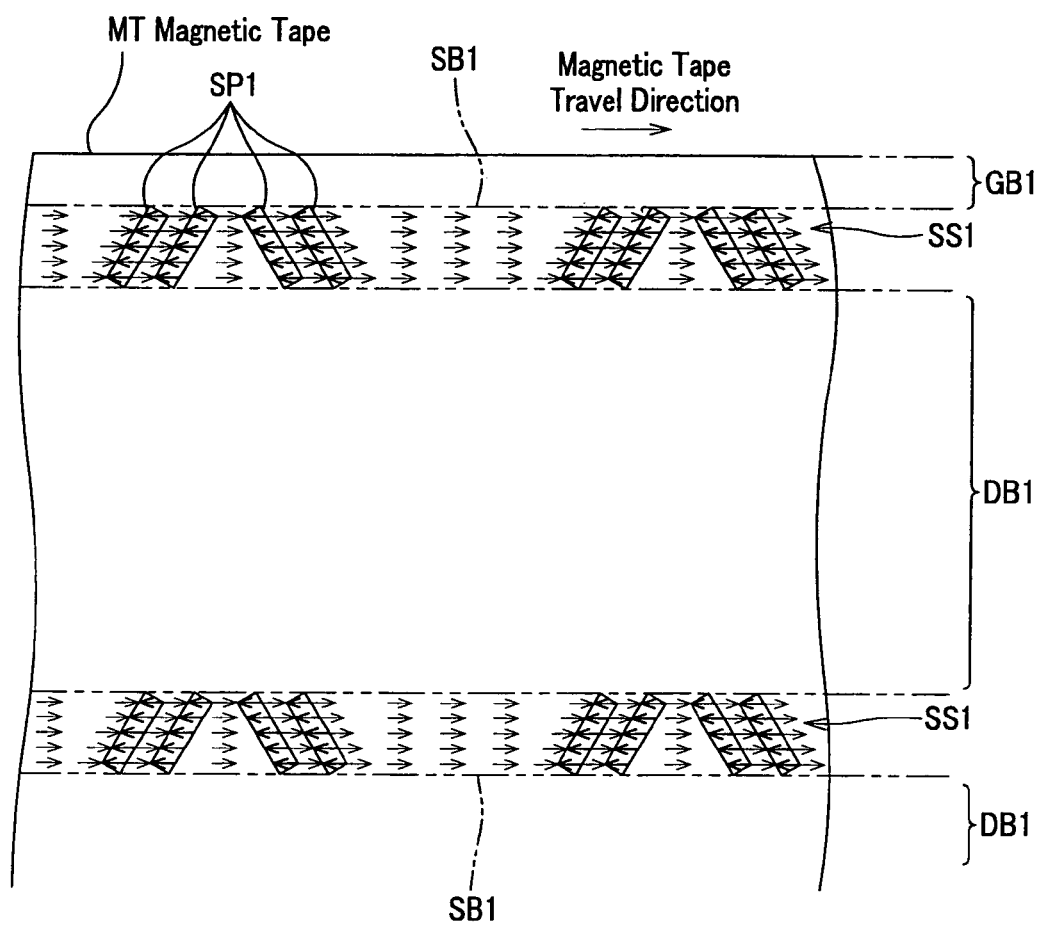
FIG. 8 is an enlarged plan view illustrating a magnetization state of a magnetic tape magnetized by the servo writer of FIG. 7.

Next, operation of the servo writer 20B of the embodiment will be described, referring to FIG. 8. FIG. 8 is an enlarged plan view illustrating a magnetization condition of a magnetic tape magnetized by a servo writer related to the embodiment.

On the supply reel 21b of the servo writer 20B (see FIG. 7) is set the pancake shape of the magnetic tape MT demagnetized all over the surface thereof in advance. Then, the DC demagnetizing head 28 magnetizes the portion, corresponding to the servo bands of the magnetic tape MT by the direct current, which tape MT is sent out of the supply reel 21b and runs by being wound by the winder 22. And as shown in FIG. 8, same as in the first embodiment, the servo write head 25 forms the servo patterns SP1 magnetized in the reverse direction on the base portion of the servo bands SB1 magnetized in the forward portion. Of course, a portion of the servo bands SB1 except for the servo patterns SP1 is magnetized in the forward direction as it is.

In such the servo writer 20B of the embodiment the servo write head 25 and the DC demagnetizing head 28 are integrally configured, and the first guides 29a regulate a movement in the lateral directions of the magnetic tape MT running between the servo write head 25 and the DC demagnetizing head 28 by an energizing force of the disc springs 31(see FIG. 7). As a result, in the servo writer 20B a sliding contact surface of the DC demagnetizing head 28 with the magnetic tape MT is generally long, so even if a distance between the second guides 29b (see FIG. 7) arranged at the upstream/downstream sides of the DC demagnetizing head 28 is obliged to be taken wide, the magnetic tape MT is not oscillated in the lateral directions thereof between the servo write head 25 and the DC demagnetizing head 28. Accordingly, the servo writer 20B of the embodiment can accurately leave a magnetization in the forward direction of the portion of the servo bands SB1. In addition, since in accordance with the servo writer 20B of the embodiment a curvature of the servo bands SB1 extending in the longitudinal directions of the magnetic tape MT can be restrained by preventing the oscillation of the lateral directions of the magnetic tape MT, the position error signal (PES) is reduced.

The magnetic tape MT where a magnetization treatment is performed by such the servo writer 20B has a plurality of the servo bands SB1 extending in the longitudinal directions of the magnetic tape MT and one of the data bands DB1 positioned between each two of the servo bands SB1. Each of the servo bands SB1 is magnetized in the magnetic tape travel direction (forward direction) of the longitudinal directions. And the servo signals SS1 are written with magnetizing each of the servo bands SB1 in the reverse direction. Meanwhile, a magnetization treatment is not performed for each of the data bands DB1 between each two of the servo bands SB1 by the servo writer 20B. Thus, the magnetic tape MT, where the servo signals SS1 are written and which is wound on the winder 22, is slit into a tape length, depending on a product specification, and is housed in a cartridge case and the like (not shown).

For the magnetic tape MT thus described, in recording/reproducing data same as in the first embodiment by the magnetic head H (see FIG. 6) of a magnetic tape drive (not shown), an output (peak voltage value) with which the servo read elements SH read the servo signals SS1 depends on a change rate or change amount between a portion where no signal is recorded and another portion where signals are recorded. And in the embodiment a magnetic direction largely varies from the forward direction to the reverse direction at a change portion from the base portion of the servo bands SB1 magnetized in the forward direction to the servo patterns SP1 magnetized in the reverse direction. As a result, same as in the first embodiment, since the servo signals SS1 can be read with a high output, the SN ratio of read signals of the servo signals SS1 can be improved.

Thus, although the first and second embodiments of the present invention are described, the invention is not limited thereto and is implemented in various forms without departing from the spirit and scope of the invention.

For example, although in the first embodiment the first guides 29a are attached through the disc springs 31 to the shaft member 33 for supporting the second guides 29b, the servo writers of the present invention are not limited thereto, and they may use a servo write head assembly where the servo write head 25 and the AC demagnetizing head 27 are integrally configured.

Figure 9B:
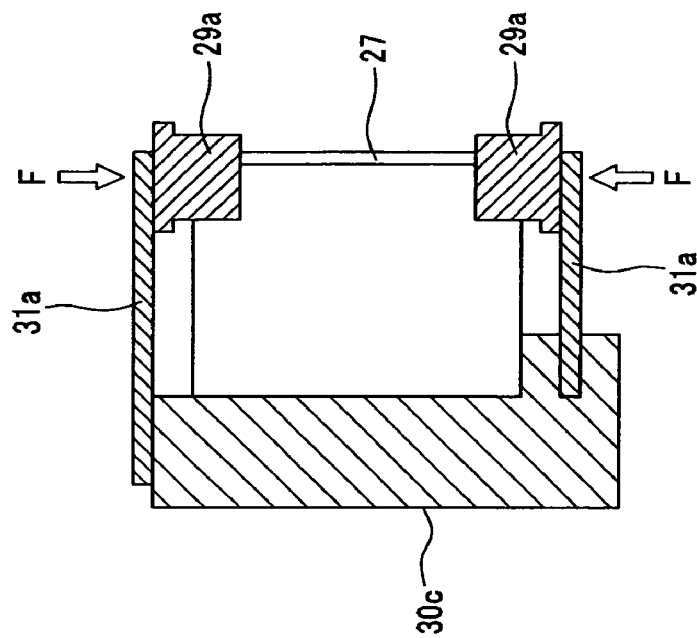
FIG. 9B is a section view taken along a line Y—Y of FIG. 9A.
Figure 9A:
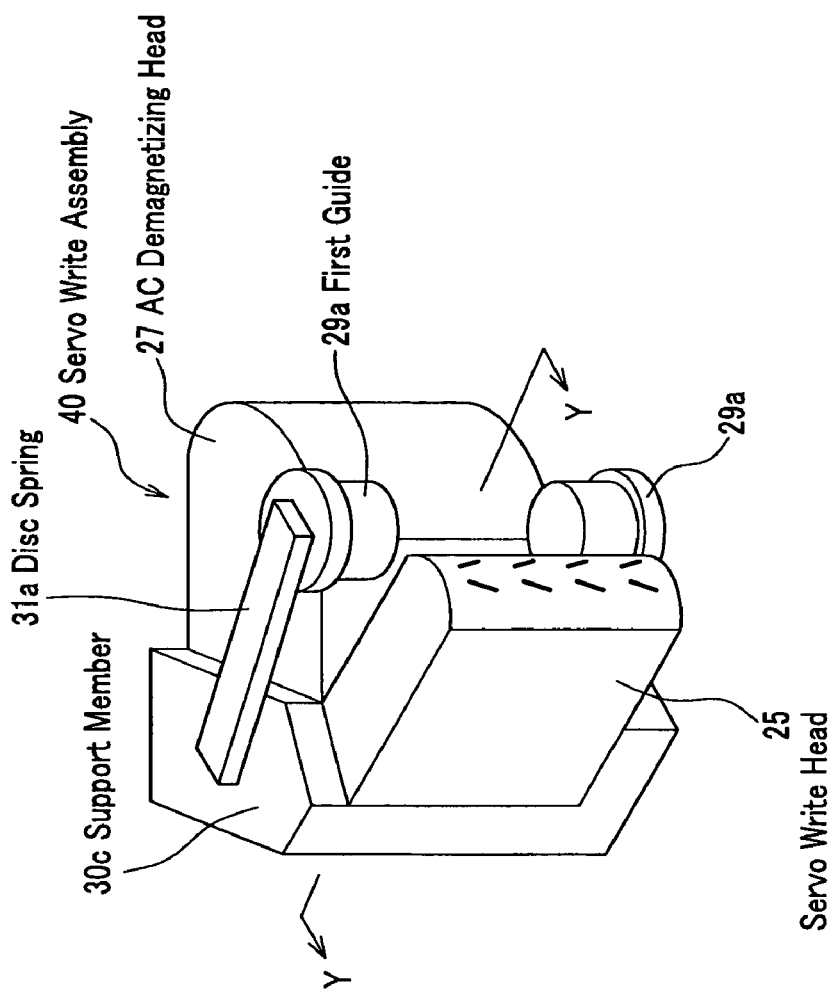
FIG. 9A is a perspective view of a servo write head assembly used for a servo writer of another embodiment.
Figures 10A, 10B, 10C, 10D:
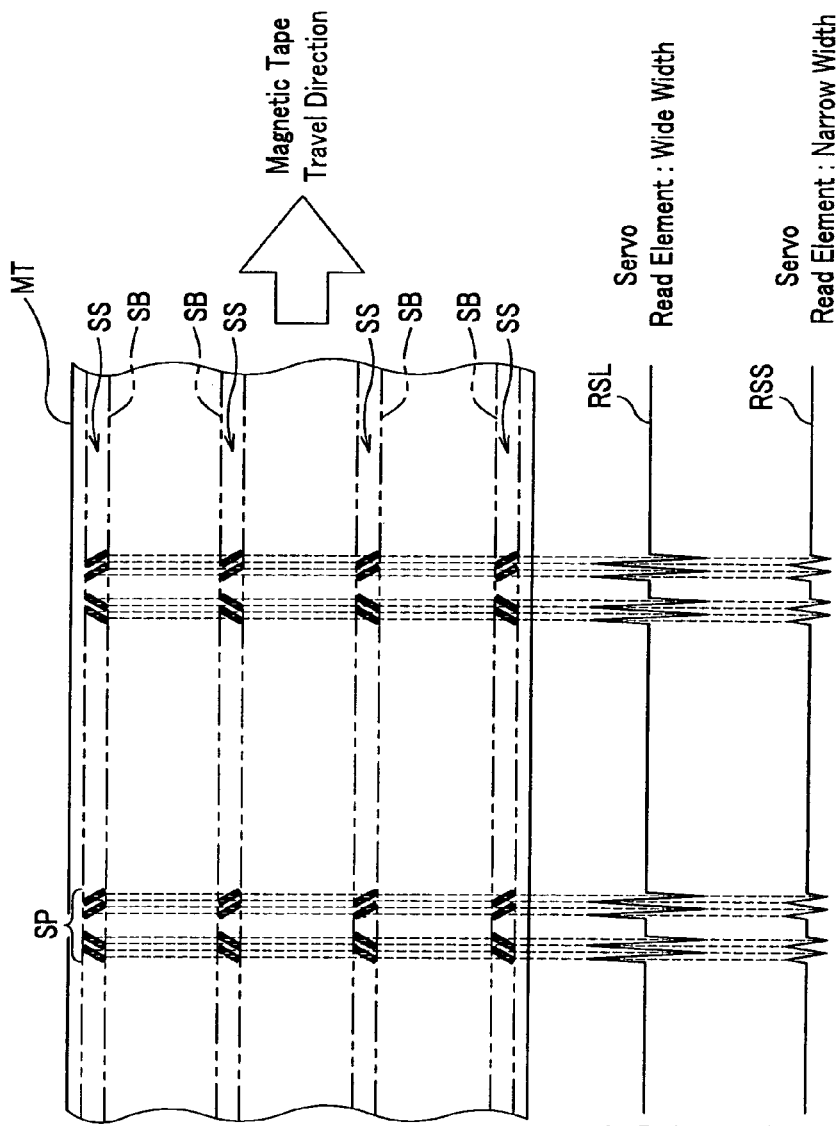
FIGS. 10A to 10D are drawings illustrating a magnetic tape having a conventional servo signal.

As shown in FIGS. 9A and 9B, a servo write head assembly 40 comprises a support member 30c and a pair of disc springs 31a; wherein the support member 30c connects the servo write head 25 and the AC demagnetizing head 27 so as to be integrally configured; and wherein bases of the disc springs 31a are connected to the support member 30c, the first guides 29a are rotatably supported by tops of the disc springs 31a extending from the support member 30c, and thus the first guides 29a are arranged between the servo write head 25 and the AC demagnetizing head 27 by the pair of the disc springs 31a. Meanwhile, FIG. 9B is a section view taken along a line Y—Y of FIG. 9A that is a perspective view of the servo write head assembly 40.

In accordance with the servo write head assembly 40, same as in the servo writer 20A of the first embodiment the servo write head 25 and the AC demagnetizing head 27 are integrally configured, and the first guides 29a regulate a movement in the lateral directions of the magnetic tape MT running between the servo write head 25 and the AC demagnetizing head 27 by the energizing force F of the disc springs 31a. As a result, in a servo writer comprising the servo write head assembly 40 a sliding contact surface of the AC demagnetizing head 27 with the magnetic tape MT is generally long, so even if a distance between the second guides 29b (see FIG. 1) arranged at the upstream/downstream sides of the AC demagnetizing head 27 is obliged to be taken wide, the magnetic tape MT is not oscillated in the lateral directions thereof between the servo write head 25 and the AC demagnetizing head 27. Accordingly, same as in the first embodiment, the servo writer comprising the servo write head assembly 40 can accurately demagnetize nothing except for the portion of the data bands DB1 and leave a magnetization in the forward direction of the portion of the servo bands SB1. In addition, since in accordance with the servo write head assembly 40 the curvature of the servo bands SB1 extending in the longitudinal directions of the magnetic tape MT can be restrained by preventing the oscillation of the lateral directions of the magnetic tape MT, the position error signal (PES) is reduced.

In addition, although in the servo write head assembly 40 the first guides 29a are attached through the disc springs 31a to the support member 30c for connecting the servo write head 25 and the AC demagnetizing head 27 so as to be integrally configured, an attachment structure of the first guides 29a in the servo write head assembly 40 may be applied to the servo writer 20B of the second embodiment. That is, the servo writers of the present invention may also be ones that comprise a servo write head assembly where the first guides 29a are attached through disc springs to a support member (not shown) for connecting the servo write head 25 and the AC demagnetizing head 27 so as to be integrally configured.

In addition, although in the first and second embodiments a recording current is designed to consist of a pulse current where a pulse current of a plus polarity and a zero current are alternately repeated, not limited to this pattern, another pulse current where a pulse current of a minus polarity and a zero current alternately repeated may also be used.

In addition, although in the first and second embodiments a base portion of servo bands is magnetized in the forward direction and a portion of servo signals is magnetized in the reverse direction, on the contrary the base portion of the servo bands may be magnetized in the reverse direction and the portion of the servo signals may be magnetized in the forward direction.

In addition, although in the first embodiment the AC demagnetizing head 27 is arranged at the downstream side of the magnetic tape travel direction of the servo write head 25, in the servo writers of the present invention the AC demagnetizing head 27 may be arranged at the upstream side of the magnetic tape travel direction of the servo write head 25.

In addition, although in the first and second embodiments the disc springs 31 are attached to a shaft member for supporting one of the second guides 29b that are arranged at the upstream and downstream side of the first guides 29a, the shaft member where the disc springs 31 are attached may be any one of shaft members of the second guides 29b arranged at-the upstream and downstream sides of the first guides 29a.

Although the first guides 29a exemplified in the first and second embodiments (see FIG. 3) and the first guides 29a used for the servo write head assembly 40 (see FIG. 9) are configured of the roller portions 32a for holding down the surface of the magnetic tape MT with circumferential surfaces thereof and the flanges 32b, which are formed at the roller portions 32a, for holding down the side edges of the magnetic tape MT that is running, and the first guides 29a are rotatably supported by the disc springs 31 or 31a (see FIGS. 2 and 9), the present invention is not limited thereto. That is, first guides used for servo writers of the present invention may not always comprise the roller portions 32a, and for example, may also be a disc shape of the first guides that press both side edges of the magnetic tape MT with one surface thereof.

What is claimed is:

1. A servo write head assembly comprising:
   an AC demagnetizing head that slides in contact with a magnetic tape all of which surface is magnetized in one direction of longitudinal directions thereof, and demagnetizes a data band of the magnetic tape;
   a servo write head that slides in contact with said magnetic tape, magnetizes a servo band of the magnetic tape in a reverse direction, and writes a servo signal; and
   a guide for regulating a movement in lateral directions of said magnetic tape that is running,
   wherein said AC demagnetizing head and said servo write head are integrally configured, and said guide is provided between said AC demagnetizing head and said servo write head, and
   wherein said servo band comprises a plurality of servo signals which provide control information for reading data from or recording data onto said data band.

2. A servo write head assembly according to claim 1, wherein said guide is comprised of a roller portion and a flange formed in said roller portion, wherein said roller portion holds down a surface of said magnetic tape with circumferential surfaces thereof, and wherein said flange holds down side edges of said magnetic tape that is running.

3. A servo write head assembly according to claim 2, wherein said guide comprises a first guide disposed on one side in lateral directions of the magnetic tape and a second guide disposed on the other side in lateral directions of the magnetic tape, and the magnetic tape is held from both lateral sides by first and second guides.

4. A servo write head assembly according to claim 1 which comprises a disc spring for pushing said guide in lateral directions of said magnetic tape, wherein one end of the disc spring is attached to said guide, and the other end of said disc spring is attached to a support member for connecting said AC demagnetizing head and said servo write head so as to be integrally configured.

5. A servo write head assembly according to claim 1, wherein said guide pushes both side edges of said magnetic tape oscillating in lateral directions with an energizing force of $0.490 \times 10^{-2}$ to $7.84 \times 10^{-2}$ N.

6. The servo write head assembly according to claim 1, further comprising a support member for connecting said AC demagnetizing head and said servo write head so as to be integrally configured.

7. A servo write head assembly according to claim 1, wherein said guide comprises a first guide disposed on one side in lateral directions of the magnetic tape and a second guide disposed on the other side in lateral directions of the magnetic tape, and the magnetic tape is held from both lateral sides by first and second guides.

8. A servo write head assembly according to claim 1, wherein the servo band and the data band are alternately positioned in the longitudinal directions of the magnetic tape.

9. A servo writer comprising:
   a magnetic tape running system that sends a magnetic tape, all of which surface is magnetized in one direction of longitudinal directions, out of a supply reel, and winds said magnetic tape with a winder, thereby running the magnetic tape;
   an AC demagnetizing head that slides in contact with said magnetic tape that is running, and demagnetizes a data band of the magnetic tape;
   a servo write head that slides in contact with said magnetic tape, magnetizes a servo band of the magnetic tape in a reverse direction, and writes a servo signal; and
   a guide for regulating a movement in lateral directions of said magnetic tape that is running,
   wherein said AC demagnetizing head and said servo write head are integrally configured, and said guide is provided between said AC is demagnetizing head and said servo write head,
   wherein said servo band comprises a plurality of servo signals which provide control information for reading data from or recording data onto said data band.

10. A servo writer according to claim 9, wherein said guide is comprised of a roller portion and a flange formed in said roller portion, wherein said roller holds down a surface of said magnetic tape with circumferential surfaces thereof, and wherein said flange holds down side edges of said magnetic tape that is running.

11. A servo writer according to claim 9 which comprises a disc spring for pushing said guide in lateral directions of said magnetic tape, wherein one end of the disc spring is attached to said guide, and the other end of said disc spring is attached to a shaft member provided at an upstream side of a magnetic tape travel direction of said AC demagnetizing head and said servo write head.

12. A servo writer according to claim 9 which comprises a disc spring for pushing said guide in lateral directions of said magnetic tape, wherein one end of the disc spring is attached to said guide, and the other end of said disc spring is attached to a shaft member provided at a downstream side of a magnetic tape travel direction of said AC demagnetizing head and said servo write head.

13. A servo writer according to claim 9, wherein said guide pushes both side edges of said magnetic tape oscillating in lateral directions with an energizing force of $0.490 \times 10^{-2}$ to $7.84 \times 10^{-2}$ N.

14. A servo writer according to claim 9, wherein said guide pushes both side edges of said magnetic tape oscillating in lateral directions with an energizing force of $0.490 \times 10^{-2}$ to $3.92 \times 10^{-2}$ N.

15. The servo writer according to claim 9, further comprising a support member for connecting said AC demagnetizing head and said servo write head so as to be integrally configured.

16. A servo writer according to claim 9, wherein the servo band and the data band are alternately positioned in the longitudinal directions of the magnetic tape.

17. An AC demagnetizing head assembly comprising:
   a guide for regulating a movement in lateral directions of a magnetic tape all of which surface is magnetized in one direction of longitudinal directions thereof;
   a disc spring for pushing said guide in lateral directions of said magnetic tape, wherein the disc spring is attached to one end of the guide; and
   a support member attached to the other end of the disc spring,
   wherein the AC demagnetizing head assembly slides in contact with the magnetic tape, demagnetizes a data band of the magnetic tape, magnetizes a servo band of the magnetic tape in a reverse direction of said one direction, and writes a servo signal onto said servo band.

* * * * *